United States Patent [19]
McNutt

[11] Patent Number: 5,334,421
[45] Date of Patent: Aug. 2, 1994

[54] PROCESS FOR COLOR CODING AN OPTICAL FIBER

[75] Inventor: Christopher W. McNutt, Newton, N.C.

[73] Assignee: Alcatel NA Cable Systems, Inc., Claremont, N.C.

[21] Appl. No.: 972,317

[22] Filed: Nov. 5, 1992

[51] Int. Cl.$^5$ ............................................. B05D 5/06
[52] U.S. Cl. ............................... 427/513; 427/169; 427/374.2; 427/379; 427/493; 427/495; 427/512; 427/514; 427/541; 427/558; 427/595
[58] Field of Search ............ 427/493, 495, 512, 513, 427/514, 541, 558, 595, 169, 374.2, 379

[56] References Cited

U.S. PATENT DOCUMENTS 5,194,292  3/1993  Billings .................................. 427/493

Primary Examiner—Bernard Pianalto
Attorney, Agent, or Firm—Ware, Fressola, Van Der Sluys & Adolphson

[57] ABSTRACT

To color code optical fibers, a ultraviolet light curable ink is mixed with a carrier fluid. The mixture is then applied to a horizontally moving optical fiber by an ink applicator using a rigid applicator die. The fiber then passes through a convection oven to evaporate the carrier fluid and a ultraviolet light radiator to cure the ultraviolet light curable ink.

12 Claims, 1 Drawing Sheet

PROCESS FOR COLOR CODING AN OPTICAL FIBER

BACKGROUND OF THE INVENTION

1. Field of the Invention

The present invention relates generally to the field of optical fiber cables and more particularly to a method of color coding the surface of an optical fiber with an ultraviolet light curable color coding ink.

2. Description of the Prior Art

The demands for optical fiber cable are ever increasing thereby necessitating more efficient and better optical fiber cable manufacturing processes for all optical fiber cable structure families. Optical fiber cable structure families which are currently being used are loose tube, slotted core, single tube and tight tube. In a loose tube structure, several gel filled buffer tubes containing optical fibers are stranded around a central strength member. The slotted core structure has optical fibers precisely placed in gel filled channels or slots. The channels are symmetrical and form a helical path along the longitudinal axis of the cable. A strength member is located in center of the slotted core cable structure. In the single tube structure, all of the optical fibers are in a single, centrally located, gel filled buffer tube. Finally, in the tight buffer tube construction, protective layers are applied in direct contact with each optical fiber so there is no fiber overlength. All the above cable structures may incorporate various sheath constructions (armored, non-armored, high strength, self-supporting, flame retardant, etc.) depending on the application and environment.

Similar to individual metallic conductors in a conventional metallic communication transmission cable, each of the optical fibers in an optical fiber cable are are color coded so as to identify each optical fiber. Typically, such color codings are achieved by applying either a polymeric color coding ink or an ultraviolet curable color coding ink to the surface of the optical fiber prior to manufacture of a finished optical fiber cable.

Polymeric color coding inks typically comprise a solid polymeric resin and pigment dissolved in a solvent. Such inks are applied by passing the optical fiber to be color coded through a rigid die applicator which is wetted with the polymeric resin and pigment solvent solution so as to contact and wet the surface of the optical fiber. After the fiber surface is wetted with the polymeric resin and pigment solvent solution, the fiber passes through a thermal oven to evaporate the solvent from the surface of the optical fiber. After evaporation of the solvent, only the polymeric resin and pigment remains on the fiber surface. Unfortunately, the solid polymeric resin pigments left on the fiber surface tend to have some reactivity with the other components of the cable such as the water blocking gel filling compounds, e.g. polyisobutylene. Also, the cables are sometime subjected to high processing temperatures and the polymeric resin and pigments tend to have thermoplastic properties which makes them flow or remelt when sufficient heat is applied to the polymeric resin and pigment on the optical fiber surface.

Ultraviolet light curable color coding inks can be used to overcome the reactivity and thermoplastic property problems associated with using solid polymeric resin and pigments. Ultraviolet curable color coding inks are typically applied as 100 percent ink solids. Such inks are applied by passing the optical fiber to be color coded through at least one rigid die applicator which is wetted with the ultraviolet ink. The applicator die contacts and wets the surface of the optical fiber with the ultraviolet ink. The wetted fiber is then passed through an ultraviolet light radiator to initiate a cross-link curing of the ink on the fiber surface. Although the ultraviolet inks add the advantage of being chemically inert after curing, unfortunately, when coating fibers with these ultraviolet inks, breakages of the fiber commonly occur. Such breakages are caused by a pinching of the fiber by the applicator dies. The pinching is a result of the need to place the applicator dies in very close proximity to the fiber surface in order to place a thin uniform coating on the surface. These breakages result in loss productivity and increase costs.

It is also desirable to have thin coatings on the optical fibers because the ultraviolet curable inks generally have a different thermal expansion coefficient than glass of the optical fibers. The difference in thermal expansion coefficients can cause the fibers to undergo microbending where a cable is exposed to extreme temperature changes. Thus, a thin coating helps to minimize this phenomena by keeping the percentage of material with a different coefficient of thermal expansion in contact with the optical fibers to a minimum.

Therefore, it would be desirable to develop a solution to the shortcomings found in the prior art.

SUMMARY OF THE INVENTION

The present invention is designed to overcome the above noted limitations that are attendant upon the use of the prior art processes and, toward this end, it contemplates the provision of a process to apply thin coatings of dispersed ultraviolet light curable inks to the surface of a glass optical fiber. The process of the present invention comprises the dispersion of an ultraviolet light curable ink into a carrier fluid prior to application to the surface of an optical fiber. Unlike the prior art, the dispersed ultraviolet light curable ink is applied to the surface of the optical fiber with an applicator die which does not have to be in very close proximity to the fiber surface to achieve a thin coating. After application of the ultraviolet light curable ink-carrier on the surface of the optical fiber, the carrier fluid is evaporated from the optical fiber surface leaving behind the ultraviolet light curable ink in an uncross-linked state. The optical fiber is subsequently exposed to ultraviolet light to initiate a cross linking reaction in the ultraviolet ink. This process is an improvement of the prior art methods for applying color coding ink in that it helps to eliminate fiber breakage caused by the pinching of the fiber by the applicator die.

The invention will be fully understood when reference is made to the following detailed description taken in conjunction with the accompanying drawings.

DETAILED DESCRIPTION OF THE INVENTION

Figure 1:
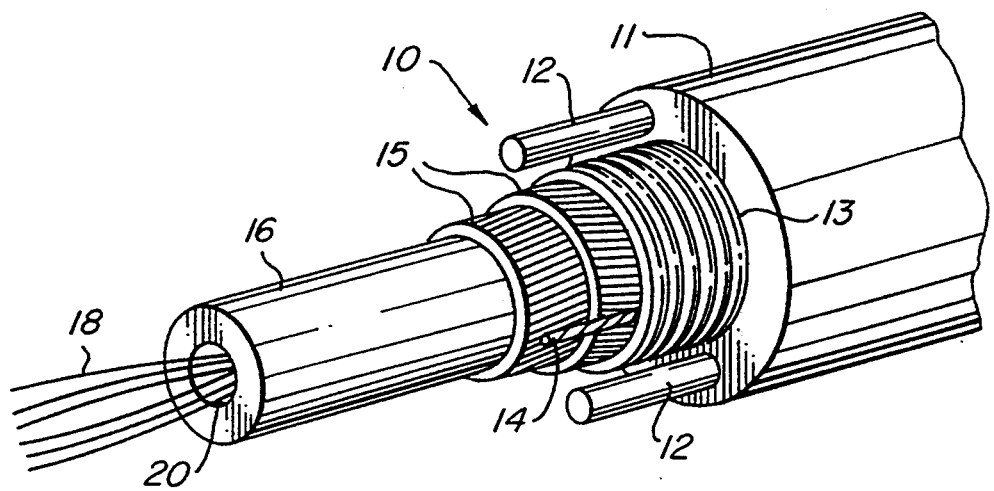
FIG. 1 is a perspective view of an optical fiber cable of the single buffer tube type partially cutaway to show the components thereof including the arrangement of the optical fibers in the buffer tube.

Referring to FIG. 1, therein is illustrated an example of a single buffer tube optical fiber cable generally indicated by the numeral 10. The optical fiber cable 10 is described in U.S. Pat. No. 5,029,974 and is typically used in an optical fiber communications network. The cable 10 comprises an outer sheath 11 with steel strength members 12 embedded therein, a metallic corrugated armor layer 13, a ripcord 14 for assisting in removal of the armor layer 13, layers of radial strength yarns 15, a buffer tube 16, a plurality of glass optical fibers 18 and a gel-like buffer tube filling compound 20. The buffer tube filling compound 20 is used for water blocking purposes in a well known manner. Although not shown, each of the optical fibers 18 has a unique color on its surface to facilitate identification of the individual optical fibers 18.

Figure 2:
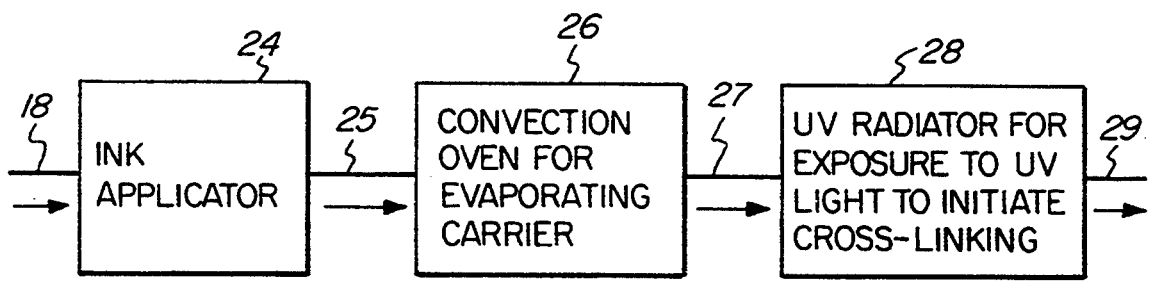
FIG. 2 is a block diagram of the apparatus used in the process of the present invention.

The coloring coding of each optical fiber 18 is performed prior to the final manufacturing of the optical fiber cable 10. Turning to FIG. 2, therein is schematically illustrated an apparatus, generally indicated by the numeral 22, for performing the process of the present invention for color coding an optical fiber 18 with an ultraviolet light curable ink.

Figure 3:
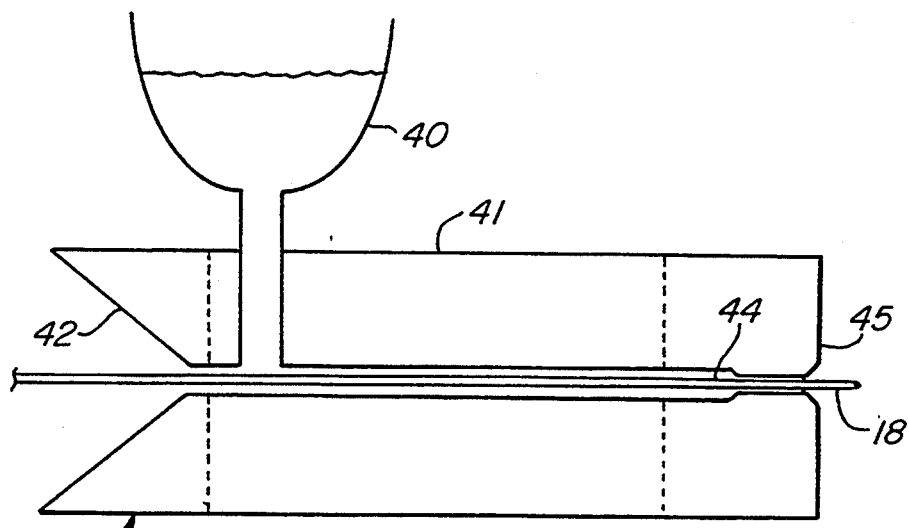
FIG. 3 is a cut away schematic diagram of the rigid die applicator used in the present invention.

The color coding process of the present invention generally comprises several steps being performed on the optical fiber 18 which is drawn horizontally through the apparatus 22 from left to right as viewed in FIG. 2. The first step of the process is performed at the rigid die ink applicator 24. The uncoated optical fiber 18 is drawn through a rigid die ink applicator 24 of the type ordinarily used to apply color coding inks to optical fibers. FIG. 3 illustrates a diagrammatic view of a rigid die ink applicator commercially available and manufactured by the Austrian company Medek & Schorner, located at Kuefsteingasse 32, P.O. Box 17, A-1142 Wien, Austria, which has been found to perform satisfactorily for the purposes of the present invention. The applicator die 24 comprises a reservoir 40 mounted on a housing 41 and an entrance die 42 at a first end 43 of the housing and an exit die 44. The applicator die 24 is continually wetted with an ultraviolet light curable ink that has been premixed with a carrier liquid so as to form an ultraviolet light curable ink dispersion. The die is dimensionally sized so it applies the ultraviolet light curable ink-carrier mixture to the horizontally moving optical fiber 18 so the optical fiber 18 is uniformly coated with the ultraviolet light curable ink-carrier when it exits the ink applicator 24 at position 25. The addition of the carrier liquid to the ultraviolet light curable ink allows a uniform coating of ultraviolet light curable ink to be applied through the use of an applicator die diameter that is larger than the diameter that would be used if the carrier liquid was not used. Because a thin uniform coating can be applied using a larger diameter die, the pinching of the optical fiber 18 is reduced which in turn helps to reduce fiber breakage caused by the pinching. The actual rigid die diameter used to apply the ultraviolet light curable ink-carrier depends upon the ink, carrier, the ratio of each used to coat the fiber surface and the desired coating thickness. Examples of the ultraviolet light curable ink-carrier dispersion which have been successfully applied ultraviolet light curable ink to the surface of the optical fiber using the process of the present invention include a mixture of approximately 35 percent by weight methyl ethyl ketone (MEK) and approximately 65 percent by weight Herkula ultraviolet light curable ink series 808, and a mixture of approximately 28 percent by weight 1-methoxy 2-propanol (PM) and approximately 72 percent by weight Herkula ultraviolet light curable ink series 808. The ratios of ink to carrier can be varied broadly from 5 to 95 percent by weight carrier depending on the applicator diameter used so as to achieve the desired coating thickness. As a general rule, the larger the rigid die diameter used, the greater the amount of carrier liquid needed to achieve the same coating thickness.

After the surface of the optical fiber 18 has been wetted with the ultraviolet light curable ink-carrier mixture, the optical fiber 18 passes through a convection oven 26 which is approximately 1.2 meters long from its entrance end to its exit end. The convection oven 26 is set to a predetermined temperature that will effectively evaporate substantially all of the carrier, leaving an uncross-linked ultraviolet light curable ink coating on the optical fiber 18 when it exits the convection oven 26 at position 27. As will be appreciated by those skilled in the art, the actual convection oven temperature used will depend on the type of carrier used, the amount of carrier present in the ultraviolet light curable ink-carrier mixture and the residence time of the fiber 18 in the oven 26.

After the fiber 18 passes through the convection oven 26, the final step is to pass the ultraviolet light curable ink coated optical fiber 18 through a conventional ultraviolet light radiator 28 which is approximately one meter in length. A Medek & Schorner GFP ultraviolet light radiator has performed satisfactorily for the purposes of the present invention. The Medek & Schorner ultraviolet light radiator 28 comprises four ultraviolet lamps (not shown) arranged about a plurality of fiber channels. The ultraviolet light radiator 28 exposes the ultraviolet light curable ink on the surface of the optical fiber 18 to ultraviolet light. As will be appreciated by those skilled in the art, the ultraviolet light initiates a cross-linking reaction in the ultraviolet light curable ink. Depending on the reactivity of the ultraviolet light curable ink used to color code the fibers to oxygen, it may be desirable to continuously flood the fiber channels of the ultraviolet light radiator with nitrogen during the photoinitiation or ultraviolet light curing process to prevent any adverse effects on the curing of the ultraviolet light curable ink by the presence of oxygen. It will be appreciated by those skilled in the art that the photoinitiation process may take place in other inert atmospheres such as argon or helium. After passing through the ultraviolet light radiator 28, the optical fiber 18 in position 29 now has a thermoset color coding on the surface thereof which is mechanically tough and chemically inert to the buffer tube gel filing compound.

Details of actual run parameters for successful coating of fiber surfaces with Herkula ultraviolet light curable link series 808 using the process of the present invention are set forth in the Table 1 below. The run parameters listed in Table 1 achieve a dry ink coating thickness below 5 microns on an optical fiber having a cross-sectional diameter of approximately 250 microns.

TABLE 1

| CARRIER FLUID, TYPE & AMT | OVEN TEMPERATURE, °C. | SPEED, meters/minute | RESIDENCE TIME IN CONVECTION OVEN, seconds | APPLICATOR DIAMETER | | NITROGEN FLOW, liters per minute | RESIDENCE TIME IN UV RADIATOR, seconds |
|---|---|---|---|---|---|---|---|
| | | | | ENTRANCE DIE, mm | EXIT DIE, mm | | |
| PM (28%) | 250 | 100 | 0.72 | .500 | .325 | 25 | 0.6 |
| PM (28%) | 150 | 128 | 0.56 | .400 | .325 | 50 | 0.47 |
| MEK (35%) | 200 | 125 | 0.58 | .400 | .325 | 50 | 0.48 |
| MEK (35%) | 150 | 128 | 0.56 | .400 | .310 | 50 | 0.47 |

It should be appreciated that the present process can be performed "on-line" where the color coding is accomplished as an integral part of the cable manufacturing process or it can be performed "off-line" where the fiber is color coded at one phase of production with no other steps being done at this stage.

Thus, it can be seen from the foregoing specification and attached drawings that the present invention provides an effective method for applying ultraviolet light curable color coding links to the surface of glass optical fibers. It should be appreciated that departures can be made by those skilled in the art without departing from the spirit and scope of the invention which is limited only by the following claims.

What is claimed is:

1. A process for color coding a surface of an optical fiber, said process comprising the steps of:
   applying a dispersion of an ultraviolet light curable color coding ink in a carrier fluid to the surface of said optical fiber;
   placing said optical fiber with the dispersed ultraviolet light curable ink thereon in a convection oven to evaporate said carrier fluid to form a carrier free ultraviolet light curable ink on said optical fiber; and
   placing said optical fiber with the carrier free ultraviolet light curable ink thereon in an ultraviolet light radiator to cause the carrier free ultraviolet light curable ink to undergo a cross-linking reaction to form a color coding ink on said optical fiber.

2. A process for color coding an optical fiber as described in claim 1, wherein the step of applying the dispersion includes providing at least one rigid applicator die through which said optical fiber passes.

3. A process for color coding an optical fiber as described in claim 2, wherein the rigid die applicator has an entrance diameter in the range of 0.40 mm to 0.50 mm and an exit diameter in the range of 0.310 mm to 0.325 mm.

4. A process for color coding an optical fiber as described in claim 1, wherein the cross-linking reaction is initiated in an inert gas atmosphere.

5. A process for color coding an optical fiber as described in claim 1, wherein the dispersion comprises approximately 65 percent by weight ultraviolet light curable ink and 35 percent by weight methyl ethyl ketone.

6. A process for color coding an optical fiber as described in claim 5, wherein said convection oven is held at a temperature in the range of approximately 150° C. to 200° C.

7. A process for color coding an optical fiber as described in claim 6, wherein the optical fiber is placed in said convection oven for a residence time in the range of approximately 0.56 to 0.58 seconds.

8. A process for color coding an optical fiber as described in claim 6, wherein the optical fiber is placed in said ultraviolet radiator for a residence time in the range of approximately 0.47 to 0.48 seconds.

9. A process for color coding an optical fiber as described in claim 1, wherein the dispersion comprises approximately 72 percent by weight ultraviolet light curable ink and 28 percent by weight 1-methoxy 2-propanol.

10. A process for color coding an optical fiber as described in claim 9, wherein said convection oven is held at a temperature in the range of approximately 150° C. to 250° C.

11. A process for color coding an optical fiber as described in claim 10, wherein the optical fiber is placed in said convection oven for a residence time in the range of approximately 0.56 to 0.72 seconds.

12. A process for color coding an optical fiber as described in claim 11, wherein the optical fiber is placed in said ultraviolet radiator for a residence time in the range of approximately 0.47 to 0.60 seconds.

* * * * *